United States Patent
Boone et al.

(10) Patent No.: US 6,453,396 B1
(45) Date of Patent: Sep. 17, 2002

(54) SYSTEM, METHOD AND COMPUTER PROGRAM PRODUCT FOR HARDWARE ASSISTED BACKUP FOR A COMPUTER MASS STORAGE SYSTEM

(75) Inventors: Steven E. Boone, Monument, CO (US); Steven J. Peters, Shrewsbury, MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/353,683

(22) Filed: Jul. 14, 1999

(51) Int. Cl.$^7$ .............................................. G06F 12/00
(52) U.S. Cl. ...................... 711/162; 711/161; 707/204; 714/6
(58) Field of Search ................................ 711/161–162; 714/6; 707/204

(56) References Cited

U.S. PATENT DOCUMENTS

| | | | |
|---|---|---|---|
| 5,163,148 A | * 11/1992 | Walls | |
| 5,655,119 A | * 8/1997 | Davy | 707/200 |
| 5,664,186 A | * 9/1997 | Bennett et al. | 707/204 |
| 5,675,725 A | * 10/1997 | Malcolm | 714/6 |
| 5,761,659 A | * 6/1998 | Bertoni | 707/8 |
| 5,778,395 A | * 7/1998 | Whiting et al. | 707/204 |
| 5,901,228 A | * 5/1999 | Crawford | 380/25 |
| 6,035,412 A | * 3/2000 | Tamer et al. | 714/6 |
| 6,185,621 B1 | * 2/2001 | Romine | 709/231 |

* cited by examiner

*Primary Examiner*—Do Hyun Yoo
*Assistant Examiner*—Nasser Moazzami
(74) *Attorney, Agent, or Firm*—William J. Kubida; Kent A. Lembke; Hogan & Hartson LLP (57) ABSTRACT

A system, method and computer program product for hardware assisted backup for a computer mass storage subsystem wherein files to be backed up from a source storage medium (e.g. disk) to a formatted storage medium (e.g. tape) are written in logical block number ("LBN") order regardless of the file's on-disk layout. If the source file structure information is available it is used or the disk blocks containing the file structure are marked in a used (or "free") block bit map which may then be modified to exclude files that are "open for write", marked as "no backup" or not part of the selected file save operation. In operation, the blocks are written to tape using a Tape Copy Data ("TCD") command. Blocks that were selected, but excluded as "open for write" may then be written to the tape utilizing more conventional methodologies. Where possible, the entire disk volume is locked during the backup operation, however, individual files may be selectively locked if all of the files are not being saved. In those instances where the size of any group of contiguous data blocks is too small to be efficaciously backed up, unmarked blocks may also be included in the transfer to speed operation.

36 Claims, 5 Drawing Sheets

SYSTEM, METHOD AND COMPUTER PROGRAM PRODUCT FOR HARDWARE ASSISTED BACKUP FOR A COMPUTER MASS STORAGE SYSTEM

CROSS REFERENCE TO RELATED PATENT APPLICATIONS

The present invention is related to the subject matter disclosed in U.S. patent application Ser. No. 09/213,760 filed Dec. 17, 1998 assigned to Digital Equipment Corporation, assignee of the present invention, the disclosure of which is herein specifically incorporated by this reference.

BACKGROUND OF THE INVENTION

The present invention relates, in general, to the field of computer storage technology. More particularly, the present invention relates to a system, method and computer program product for saving, or backing up, data from a computer disk drive to a tape backup system as expeditiously as possible.

Modern computers perform a variety of tasks. Obviously, for example, computers perform computations. Most recently, computers have also gained popularity as communication devices, providing electronic mail ("e-mail") and internet access capabilities. No less important, however, is a computer's capability of storing and managing large amounts of data, such as on a magnetic disk, a compact disk read only memory ("CDROM") or a magnetic tape.

Mass data storage is a crucial aspect of modern computer usage. For example, a bank typically stores large volumes of data, including customer records, financial market data, and internal business records, in large interconnected computer systems. Current data is generally stored in primary storage media, such as memory arrays, magnetic hard disks or optical disks, for rapid access. In many organizations, however, this data is regularly archived (or "backed-up") on archive media, such as alternate magnetic or optical disks or for larger volumes on magnetic tape, to preserve the data for future access. Preferably, the current data is copied from the primary storage media in the computer system to the archive media. The archive media is then stored in a safe location, preferably off-site, to protect the archived data from destruction. In this manner, the existence of the current data on both the primary storage media and the archive media minimizes the risk of losing the data. For example, a fire at the bank could destroy the copy of the data in the primary storage media, but the archived data copy would still be intact. The bank could then load the archived data into the computer system to recover most of the necessary data. In the recovery process, data recorded on the tape is typically read from the tape and re-recorded on a primary storage medium.

Data recorded onto a magnetic tape is typically organized into a specific tape format. Tape formats can vary according to tape types (e.g., ½ inch, ¼ inch, and 8 mm magnetic tape). For example, on a ½ inch reel tape, data bytes are typically recorded in parallel data records onto the nine track tape. The number of bytes in a physical data record vary between one and 65,535 bytes. The available tape formats for ½ inch reel tapes generally include 800 BPI (Bytes Per Inch), 1,600 BPI, and 6,250 BPI. Actual storage capacity is a function of the recording format and the length of the tape reel. In contrast, on a ½ inch cartridge tape, data is recorded serially onto the ½ inch cartridge tape. The data records are recorded on cartridge tape tracks in a serpentine manner. As one track is completed, the recording drive switches to the next track and begins writing in the opposite direction, eliminating the wasted motion of rewinding. The number of bytes per data record is determined by the physical data record size specified by the recording device. Accordingly, the tape format in which data is to be recorded onto or read from the tape can affect, among other characteristics, storage capacity, transfer rate, data organization, and the mechanical movement of the tape during recording.

As the amount of data residing in the computer system increases, however, the time and computer resources required to archive the data also increase. In many circumstances, for example, back-up procedures are performed after normal work hours to minimized the impact on the performance of the computer system during the normal business day. In a typical configuration, data stored on one or more magnetic hard disks is read into a host computer system and organized (i.e., formatted) to be compatible with a particular tape data format. The host system then records the formatted data onto the magnetic tape. This continuous involvement of the host system in the back-up process consumes substantial host system computing cycles and decreases the host system's performance in other processes. Furthermore, to process the data at rates sufficient to keep up with the streaming speed of the tape, the involvement of the host system, including communication to and from the host system, becomes a bottleneck. Consequently, need exists for a system and method to minimize the host system involvement in the tape backup and recovery processes, particularly during the transfer of the data to and from the source storage medium to the tape.

Conventional backup operations in computer systems incorporating one or more storage controllers operating under host supervision have included a backup program that performed the necessary backup operations through the storage controller. Although relatively fast, it suffered from the requirement that the storage devices to be backed up had to be removed from host access for the entire duration of the backup operation. Moreover, the process could not identify storage devices that were then in use which resulted in the saving of storage space that was not being used. The net result was an effective consumption of excess tape storage resources and ultimately slower performance.

Alternative host-based storage solutions required the central processing unit ("CPU") to move large amounts of data into and out of main memory. This required the use of large amounts of CPU cycles, caused data to be moved twice over the storage system interconnects (to get the data into and out of main memory) and often could not drive the associated storage devices at their peak performance.

It would, therefore, be highly desirable to utilize the computing power in high performance storage controllers to increase the performance of disk-to-tape online backup operations.

SUMMARY OF THE INVENTION

The present invention utilizes the computing power of present day high performance storage controllers in conjunction with host computer based computer program products to increase the performance of disk-to-tape online backup operations. Through the collaborative use of a storage controller and host-based software, a high performance on-line backup solution has been provided which, in a particular implementation thereof, resulted in a four times increase in backup bandwidth over conventional host based solutions while concomitantly reducing the load on the host processor from 100% during traditional backup operations to less than 10%.

By splitting the backup process into a host-based component and a storage controller component, a number of traditionally encountered problems have been ameliorated. First, the system and method of the present invention allows the host component to interact with other processes in the host environment to prevent deadlocks and data access conflicts. Secondly, it allows a user to monitor the progress of the backup operation and stop it if necessary. Thirdly, it allows for the identification of data that might require some other sort of operation performed on it. By essentially freeing up some computing power from the host to address these issues, the task of the storage controller can be optimized to move data to tape as quickly and efficaciously as possible.

The system and method of the present invention provides a host-based computer program implemented functionality that enables part of the backup operation to be performed by the host itself while concurrently utilizing specially implemented storage controller based functions to perform the backup operation. This is effectuated by providing the storage controller with a command that allows for the transfer of a contiguous group of disk drive blocks to a tape drive. Reading groups of contiguous blocks is the optimal way to read data from a disk, and by sending the storage controller groups of contiguous blocks, the task of the storage controller is kept simple so that it can be optimized and is easy to implement. The system and method of the present invention may be utilized in conjunction with a storage controller that controls both the disk drive and tape drive as well as a tape controller configured to read data from the disk drive over a network or storage interconnect.

In operation, the process begins with the host software setting up the destination media, e.g. a tape on a tape drive. The host software then allocates the drive and initializes the media. At this point, the host-based process initiates a scan of the filesystem for files the user has specified for backup, which, in many cases may be all of the files. The process then locks the files specified and creates a bitmap of "in use" blocks. In the case of a full disk backup operation, the operating system may allow the entire disk to be locked in a single command and the filesystem may maintain a "used" (or, alternatively, a "free") block bitmap in this regard. The bit map is then scanned for groups of contiguous blocks with the possibility that small "holes" (or gaps) in the contiguous blocks (e.g. on the order of 5–10 or more unused blocks) can be effectively ignored to create larger groups.

The large groups of contiguous blocks are then packaged as a single command and set to the storage controller which then copies them from the disk drive to the tape media. The remainder of the disk blocks are read into the host computer memory, assembled into tape records and written to tape. At anytime during the transfer operation, the process can be stopped by the host process. If any errors or unusual cases are encountered, the host process may handle the condition (e.g. a media change on the tape drive) and continue the backup process. Alternatively other errors or unusual conditions may cause the controller to stop processing and return progress and status information to the host process. At the completion of the data transfer, the locks and other resources are released and the tape data set is closed.

The system and method of the present invention effectively and efficiently utilizes the capabilities of two different processes to perform high speed on-line backup operations. The host process solves the "on-line" related problems of deadlock and data access conflicts and when the host process locks the files, it can control overall access to the data. When another process on the host system requires access to the data that is then being saved, it can either wait on the lock or the backup host process can release the lock and remove the data from the "in use" block bitmap. The locking function also prevents the backup process from accessing data that is currently in use.

On the other hand, the controller process performs data movement in a faster and more efficient manner than would be possible through a host-based process which would require that the data be first moved into main memory and then back out to the tape drive for backup. Such double use of the storage interconnects would naturally slow any backup operation. In comparison, the storage controller process allows for the movement of data directly between the disk drive and the tape device. Because the controller is provided groups of contiguous blocks of data, the disk drives are accessed in disk block order which is the fastest way to read the data from the disk. The tape drive can then be written in a continuous stream of data thereby also allowing the tape drive to operate at peak "streaming" speed.

In essence, the system and method of the present invention differs from conventional controller-based backup operation by allowing storage to remain accessible. This is effectuated by using a host-based process to control data access conflicts with other host processes. Still further, the system and method of the present invention can utilize the filesystem knowledge of the host to prevent the controller from backing up unused disk space while still using the controller hardware to perform tasks which it can accomplish much more expeditiously and efficiently than the host.

Particularly disclosed herein is a system, method and computer program product for hardware assisted backup for a computer mass storage subsystem wherein files to be backed up, or otherwise saved, from a disk to a tape media are written to the tape in logical block number ("LBN") order regardless of the file's on-disk layout. If it is available, the disk file structure information may also be written to the beginning of the tape to allow subsequent file-level restore operations to be performed. If the file structure information is not available in a concise form, the disk blocks containing the file structure are marked in a used block bit map and also written to the tape medium. File-level restore operations are advantageously able to understand the disk structure so that the appropriate blocks can be read in to build the file system table.

The used-block bit mask may be modified to exclude files that are "open for write", marked as "no backup" or not part of the selected file save operation. In operation, the blocks are written to tape using Tape Copy Data ("TCD") commands as disclosed and claimed in the aforementioned patent application assigned to Digital Equipment Corporation. Blocks that were selected, but excluded as "open for write" may then be written to the tape utilizing more conventional methodologies. Where possible, the entire disk volume is locked during the backup operation. However, the system and method of the present invention also allows for the locking of individual files if all of the files are not being saved. In those instances where the size of any group of contiguous data blocks is too small to be efficaciously backed up, unmarked blocks may also be included in the transfer to tape to speed operation and the host computer input/output ("I/O") can be utilized to write data to the tape if such is faster than creating a TCD command.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
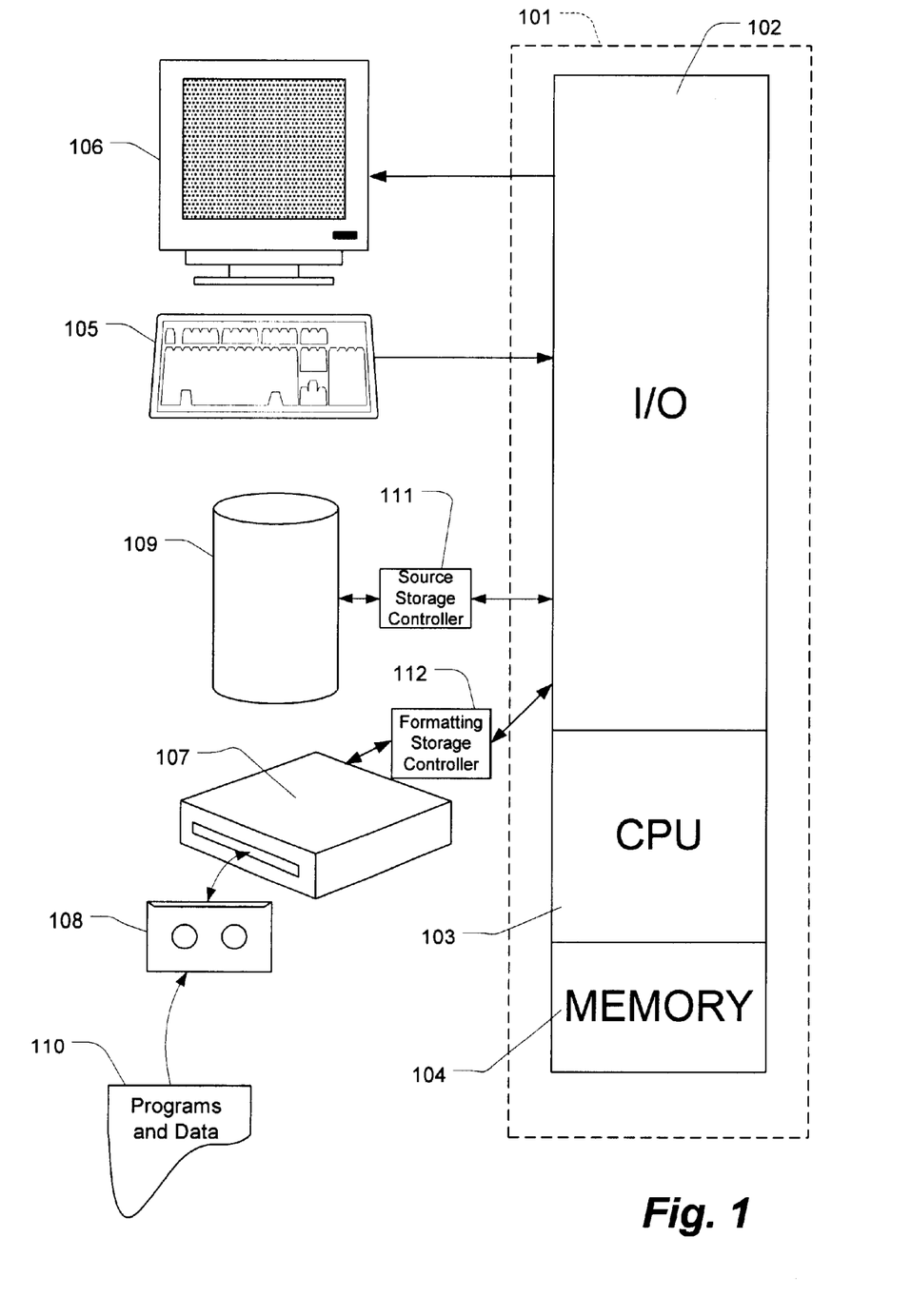
FIG. 1 illustrates a simplified general purpose computer for possible use in conjunction with the system and method of the present invention.

With reference now to FIG. 1, an operating environment in which the present invention is potentially useful is shown which encompasses the general purpose computer. In such a system, data and program files may be input to the computer, which reads the files and executes the programs therein. Some of the elements of a general purpose computer are shown in this figure, wherein a processor 101 is shown having an input/output ("I/O") section 102, a Central Processing Unit ("CPU") 103, and a memory section 104. The present invention is optionally implemented in software devices loaded in memory 104 and/or stored on a configured tape 108, storage unit 109 or other storage device thereby transforming the computer system in FIG. 1 to a special purpose machine for implementing the present invention.

The I/O section 102 is connected to keyboard 105, display unit 106, disk storage unit 109, and formatted storage drive unit 107. Generally, in contemporary systems, the formatted storage drive unit 107 is a tape drive (as shown) capable of reading from and recording to tape 108 or other sequential access storage medium, which typically contains programs 110 and data. Computer program products containing mechanisms to effectuate the apparatus and methods in accordance with the present invention may reside in the memory section 104, on the disk storage unit 109, or on the tape 108 of such a system. Alternatively, formatted storage drive unit 107 may be replaced or supplemented by a floppy drive unit, a CDROM drive unit, or other formatted or random access storage medium drive unit. Disk storage unit 109 is preferably coupled to processor 101 by source storage controller 111, and formatted storage drive unit 107 is preferably coupled to processor 101 by formatting storage controller 112, which may alternately be integral to formatted storage drive unit 107. Examples of such systems include VAX® and ALPHA® systems and personal computers offered by Compaq Computer Corporation, personal computers offered by other manufacturers, and other systems running VMS®, Windows® NT, a UNIX®-based operating system or another typical operating system. In accordance with the present invention, host system software modules may be executed by CPU 103, and command block, data definition, and on-media structure definition, as well as source and destination data, may be stored on disk storage unit 109 or other storage medium units coupled to the system. Other field sizes are also contemplated in accordance with the present invention.

Figure 2:
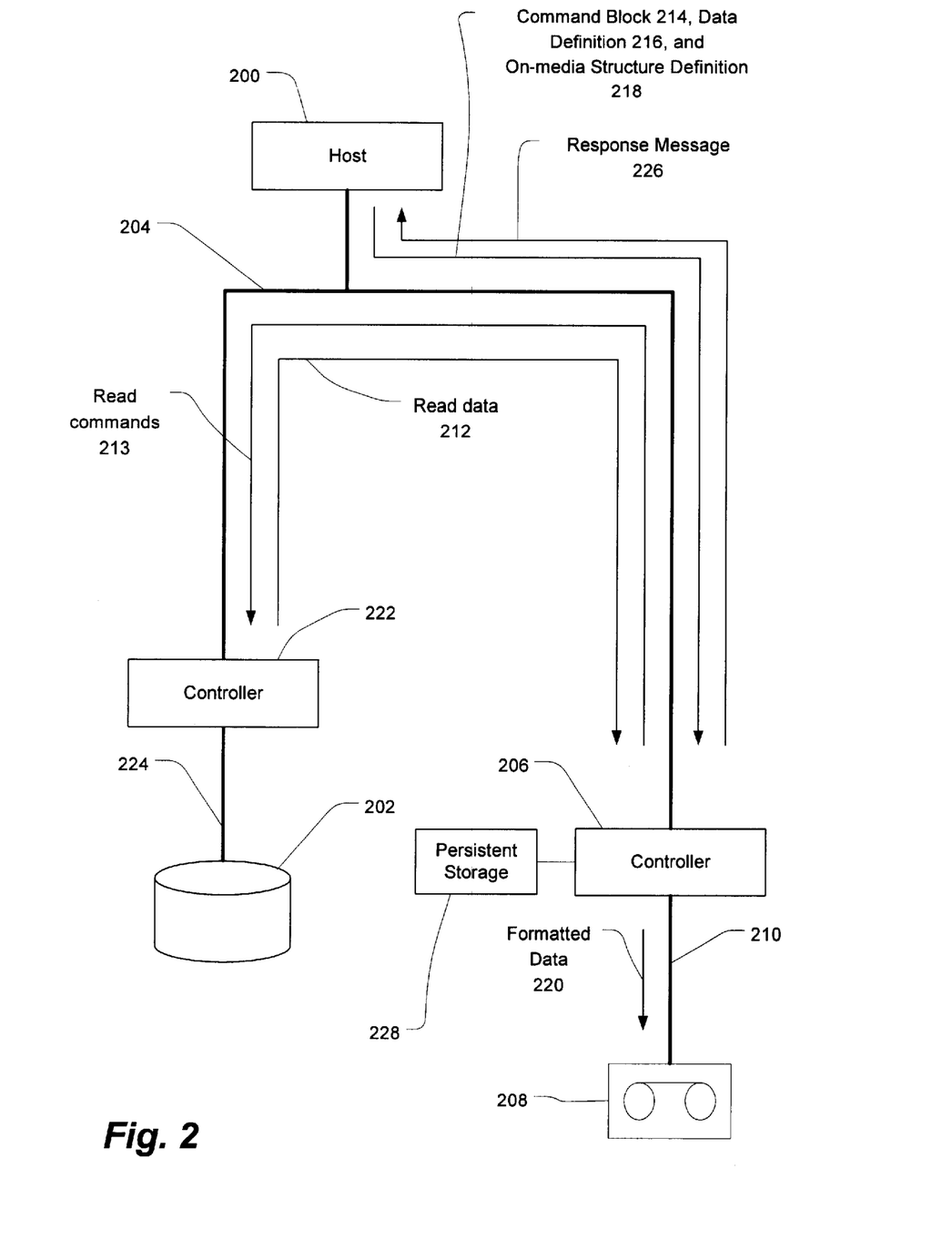
FIG. 2 illustrates a simplified exemplary system embodiment in accordance with the present invention.

With reference additionally now to FIG. 2, an exemplary system embodiment in accordance with the present invention is depicted. The host system 200 is preferably coupled to the source storage controller 222 and the formatting storage controller 206 by the internal data bus 204. It should be understood that the host system 200, the source storage controller 222, and the formatting storage controller 206 may also be linked by a computer network, a peripheral cable, or another conventional data coupling. Furthermore, multiple host systems may be supported to initiate a formatted transfer operation. Likewise, multiple source storage controllers, formatted storage controllers and storage media may be operated simultaneously in accordance with the present invention.

Preferably, host system 200 provides instructions (e.g., data identifying the source storage medium) to allow the formatting storage controller 206 to configure a logical connection between itself and the source storage controller 222 to allow the two controllers to communicate and transfer data without continuous interaction by the host. In the exemplary embodiment shown in this figure, the source storage controller 222 is preferably coupled to a source storage medium, e.g., the magnetic hard disk 202 by link 224, and the formatting storage controller 206 is preferably coupled to a formatted storage medium, i.e., magnetic tape 208, by link 210. In alternate embodiments, a source storage medium may include without limitation optical storage disks, reel or cartridge magnetic tapes, and other conventional storage media, formatted or unformatted. Likewise, the formatted storage medium may include without limitation reel or cartridge magnetic tapes, magnetic or optical disks, or any other conventional high-level or low-level formatted storage media.

In the illustrated embodiment, the host system 200 sends command block 214, data definition 216, and on-media structure definition 218 to formatting storage controller 206. The command block 214 preferably includes an on-media structure select field. In the example illustrated, the host system 200 may directly initialize the formatting storage medium at the beginning of the process and then use a TCD command to later start the transfer. Alternatively, the host system 200 may send the command block 214 to the formatting storage controller 206 to initialize the formatting storage medium and to initiate the transfer of data from the source storage medium. At the completion of data transfers or upon the occurrence of an exception, the formatting storage controller preferably signals the host system 200 using response message signal.

The data definition 216 preferably includes a list of one or more transfer definitions and a transfer flag. Generally, in the backup process, the data definition 216 identifies the source disk 202 and describes the location of data to be read from disk 202. Alternately, the data definition 216 can identify multiple source storage media, include source disk 202, from which data can be read for storage on a formatted storage media. By receiving and processing the data definition 216, the controller 206 can locate and read the defined read data 212 from disk 202 across bus 204. Preferably, the formatting storage controller 206 sends read commands 213, specifying data indicated in the data definition 216, to the source storage controller 222 to access the data stored on the source storage medium 202.

Generally, any error recovery is handled by the host process using standard I/O operations. A more complex data definition can also used to write data to multiple storage blocks or multiple storage mediums, in accordance with the present invention. As such, the data definition may be structured and used in a similar fashion in both read and record modes. The on-media structure definition 218 preferably includes, among other fields, a header descriptor, a trailer descriptor, a Block size, a Block Structure, and an Error Correction Code ("ECC") algorithm specification. Generally, the on-media structure definition 218 describes the format in which read data 212 is to be recorded onto tape 208. The data resulting from the formatting operation of formatting storage controller 206 is illustrated as formatted data 220. Host system 202 initiates the transfer process by sending command block 214 to the formatting storage controller 206, which parses the command block 214 and performs the archival operation as directed therein.

The persistent storage unit 228 is preferably coupled to the formatting storage controller 206 to store one or more on-media structure definitions, which may be referenced through an on-media structure select field in the command block 214. The on-media structure select instructs the formatting storage controller 206 which on-media structure definition to use from the persistent storage unit 228. In this embodiment, the formatting storage controller 206 may select by reference a number of on-media structure definitions that are stored in the persistent storage unit 228. To indicate which supported on-media structure definition to apply during a transfer operation, a host system stores an on-media structure selector in the on-media structure select field of the command block 214. The formatting storage controller 206 receives the command block 214, reads the on-media structure selector, and selects the corresponding on-media structure definition from the persistent storage unit 228 for use during data transfer, thereby alleviating the requirement that the host provide a detailed on-media structure definition in the command block 214. Preferably, the formatting storage controller 206 supports access by the host system 200 to record one or more on-media structure definitions in persistent storage unit 228 via command block 214. The persistent storage unit 228 preferably includes a non-volatile memory but may alternately include without limitation a magnetic or optical disk or other persistent media.

In a representative "verify copy" operation which may be additionally performed in accordance with the system and method of the present invention, a read operation may be performed on both a source storage unit (e.g. source disk 202) and a formatted storage unit (e.g. magnetic tape 208) with the formatting storage controller 206 performing a comparison operation on the resultant data. Further, a "formatted read" operation may be performed wherein data is read from a formatted storage unit (e.g. magnetic tape 208) by the formatting storage controller 206 and then written to a destination (or source) storage unit (e.g. source disk 202).

Figure 3:
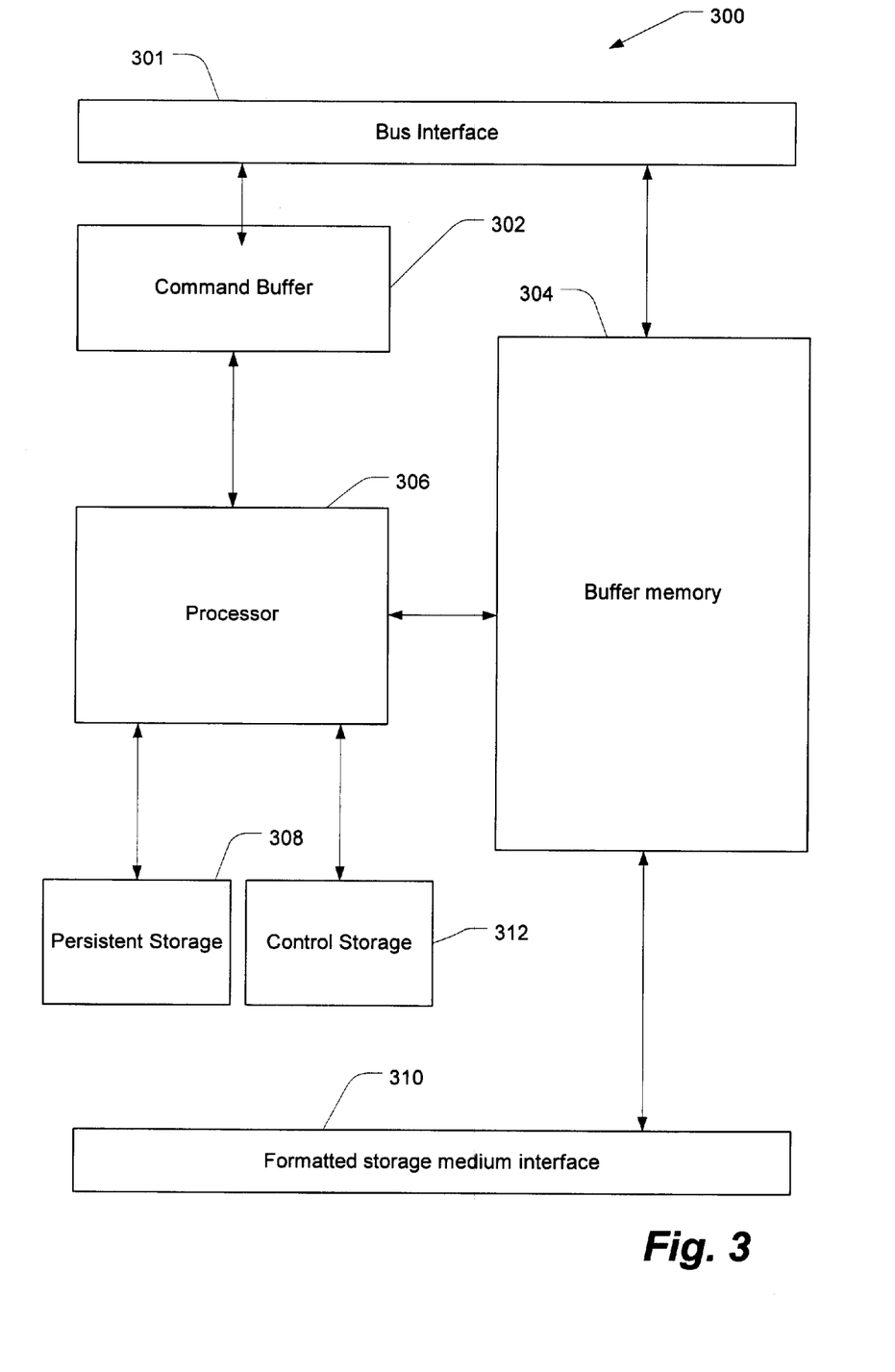
FIG. 3 illustrates a functional block diagram of an exemplary embodiment of a formatting storage controller in accordance with one aspect of the present invention.

With reference additionally now to FIG. 3, a block diagram of an exemplary formatting storage controller 300 in accordance with the present invention is shown. Preferably, the bus interface 301 is coupled to one or more host systems and one or more source storage controllers by a bus, as exemplified in the preceding FIG. 2. The bus interface 301 manages communications among the formatting storage controller 300, one or more host systems (see for example the host system 200 of FIG. 2) and/or a source storage controller (see for example the source storage controller 222 of FIG. 2). The command buffer 302 preferably receives a command block from a host system to initiate the data transfer operation. The processor 306 controls the data transfer operation by accessing the command block, establishing a logical connection with a source storage controller, reading the desired data (as indicated in the data definition) from the source storage controller without continuous interaction with the host system, and formatting the read data to record it on the formatted storage medium. The processor 306 may be a microprocessor, a script processor, or any other type of processor capable of controlling the data transfer operation. Buffer memory 304 is preferably a random-access memory device for receiving data from a source storage medium through the bus interface 301. The processor 306 is capable of controlling the data in the buffer memory 304, preferably formatting it for recording to a formatted storage medium through the formatted storage medium interface 310. The processor 306 preferably includes or is coupled to a control storage 312 (such as non-volatile memory or instruction cache) for storing instructions that control the processor's operation in response to a received command block. The processor 306 also preferably includes registers and other necessary circuitry to perform the instructions for controlling the transfer process. The persistent memory unit 308 is configured to store one or more on-media structure definitions on which the processor 306 bases the format in which data is recorded to a formatted storage medium. The desired on-media structure definition may be referenced by way of an indicator stored in the command block, although other reference mechanisms, such as a persistent indicator set by the host system, are also contemplated within the scope of the present invention.

The formatting storage controller 300 may be implemented in a chip set (for example, mounted on a system board, on an adapter card, or in a peripheral storage unit) or integrated into a single chip. Other known controller configurations are also contemplated within the scope of the present invention.

Figure 4A:
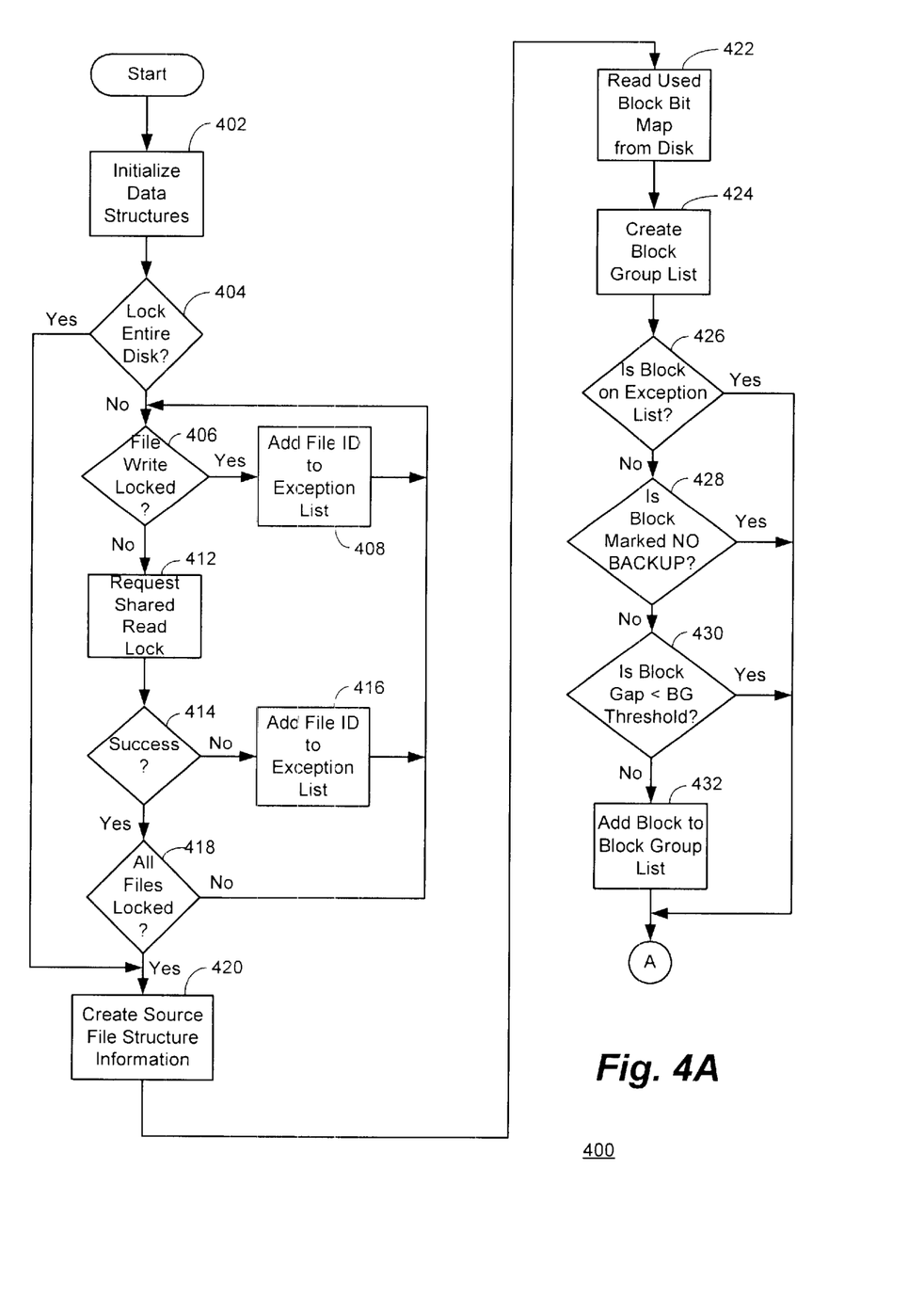
FIGS. 4A and 4B are collectively a logic flowchart representative of a representative system and method for saving or baking up data from a computer disk drive to a tape backup system in accordance with the present invention.
Figure 4B:
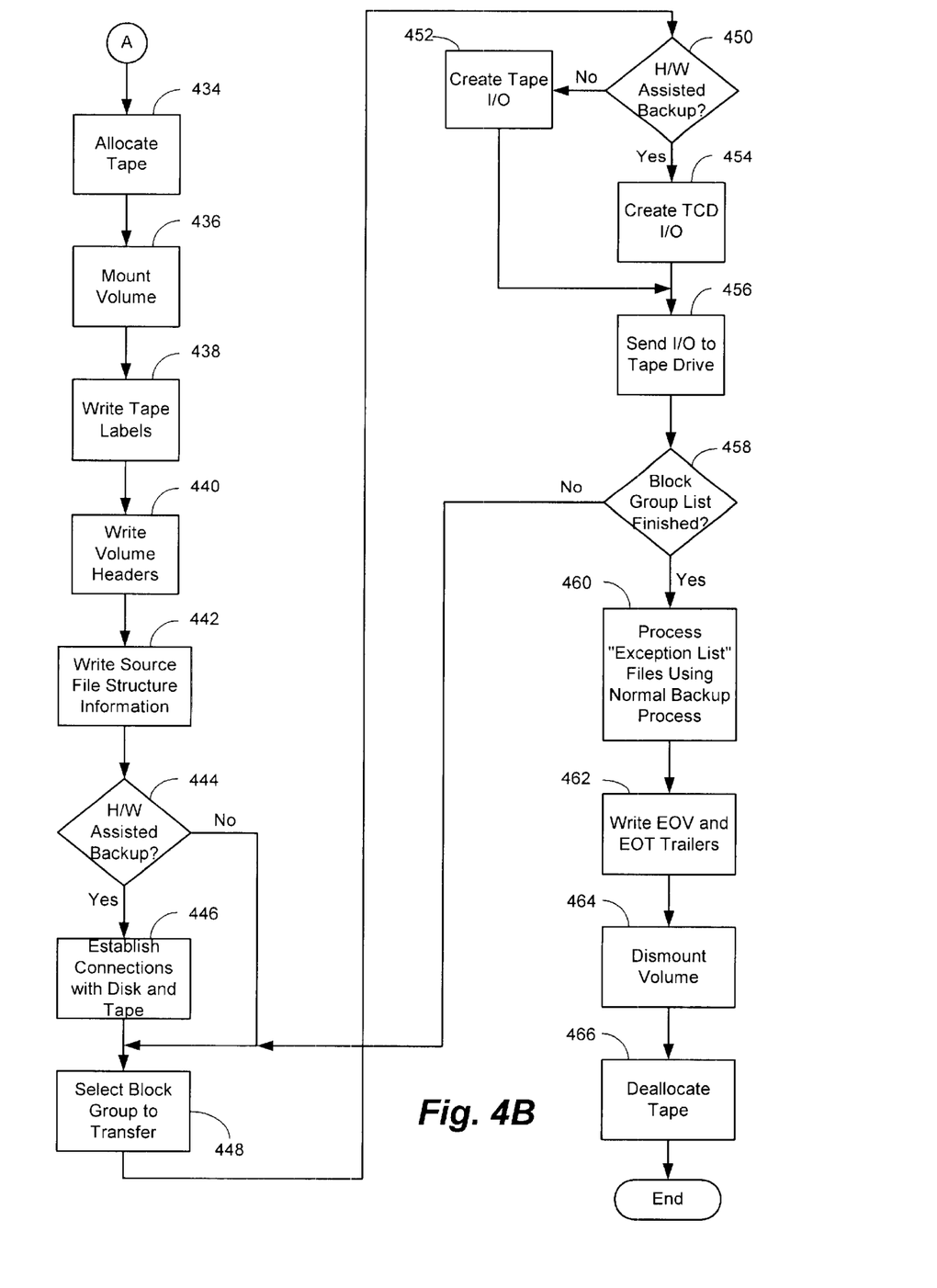

With reference additionally now to FIGS. 4A and 4b, a backup process 400 in accordance with the present invention is shown. The process 400 begins at step 402 with the initialization of the data structures. At decision step 404, if the entire disk to be backed up can be locked, or taken off line, the process 400 can by pass a number of the succeeding steps and proceed to step 420 as will be more fully described hereinafter. On the other hand, if the entire disk cannot be taken off line to effectuate the backup process 400, the individual files are considered at decision step 406 to see if they are write-locked.

If a given file is write locked, at step 408 the file ID is added to the exception list that will be compiled and the backup process 400 returns to decision step 406 for all of the files on the disk. If the file is not write-locked, then at step 412 a request is made for a shared read lock on that file. If the request is not successful, then the file ID is added to the exception list that is being compiled and the process 400 returns to decision step 406. If the request for a shared read lock is successful, then, at decision step 418, a determination is made as to whether all of the files are now locked. If they are not, the process 400 returns to decision step 406 to consider the particular file. Otherwise, if all of the files are now locked, then the source file structure information is created at step 420, the used block bit map is read from the disk at step 422 and a block group list is created at step 424.

At decision step 426, the exception list is consulted to determine if a given block has been previously added to the list. If it has, then the process proceeds to step 434 (FIG. 4B) as will be more fully described hereinafter. Alternatively, if the block is not on the exception list, the process 400 proceeds to decision step 428 to determine whether or not the block is marked as "No Backup". Again, if it is, the process 400 proceeds to step 434. If the file is not marked "No Backup", then, at decision step 430, the block gap is analyzed to determine if it is less than a predetermined block gap ("BG") threshold. If it is, the block will be backed up regardless of its prior identification on the exception list or its having been marked as "No Backup" just to speed the overall backup process 400 and it will then proceed to step 434. If the block gap is greater than or equal to the block gap threshold at decision step 430, then the block is added to the block group list at step 432.

With reference specifically to FIG. 4B, step 434 initiates a portion of a standard tape backup procedure wherein the tape is allocated, the volume is mounted at step 436 and the tape and volume labels are written at steps 438 and 440 respectively. At step 442 the source file information structure is written and, at decision step 444, a determination is made as to whether or not the backup process 400 is a hardware ("H/W") assisted backup in accordance with the present invention. If it is, then at step 446 connections with the disk to be backed up and the tape are established. Otherwise, the process omits this step and proceeds to step 448 wherein, in any event the process 400 continues by selecting the block group to transfer. If the block group to be transferred is to be a hardware assisted backup operation at decision step 450, then the tape copy data ("TCD") I/O is created at step 454. Otherwise, the tape I/O is created at step 452. It should be noted that the host performs the functions of TCD including read disk data, format the data and write the data to tape.

In either event, the process 400 continues to step 456 where the I/O is sent to the tape drive. If the block group list is not finished, the process 400 returns to step 448 to select the next block group to transfer from disk to tape. Alternatively, if it is the last block group on the list previously created, the process 400 proceeds to step 460 where the exception list files are processed utilizing normal backup processes, the end of volume ("EOV") and end of tape ("EOT") trailers are written at step 462, the volume is dismounted at step 464 and the tape is deallocated at step 466.

While there have been described above the principles of the present invention in conjunction with a specific storage subsystem architecture, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A method for backing up data on a source storage medium to a formatted storage medium in a computer system having at least one host-computer and an associated storage controller, said method comprising:

identifying files on said source storage medium specified for backup, said identified files comprising blocks of data;

establishing which of said identified files are currently in use, wherein said establishing includes determining if each of said identified files is previously locked and constructing an exception list of each of said previously locked files;

determining groups of said blocks of data for said identified files not currently in use, wherein said determining includes assembling said groups of said blocks of data into contiguous blocks of data; and copying said groups of said contiguous blocks of data from said source storage medium to said formatted storage medium in logical block number order.

2. The method of claim 1 wherein said steps of identifying, establishing and determining are carried out by said host computer and said step of copying is carried out by said storage controller.

3. The method of claim 1 wherein said step of identifying files on said source storage medium comprises the steps of:

ascertaining if said identified files comprise an entire contents of said source storage medium; and locking said source storage medium from subsequent accesses thereto during said backing up process.

4. The method of claim 1 wherein said step of determining if each of said identified files is previously locked further comprises the steps of:

determining if each of said identified files is write locked.

5. The method of claim 4 wherein said step of determining if each of said identified files is write locked further comprises the step of:

requesting a shared read lock prior to adding said identified file to said exception list.

6. The method of claim 1 wherein said step of assembling said groups of said blocks of data into contiguous blocks further comprises the step of:

ignoring gaps in said contiguous blocks of data less than a predetermined gap threshold.

7. The method of claim 1 wherein said step of copying said groups of said blocks of data from said source storage medium to said formatted storage medium comprises the step of:

writing said files to said formatted storage medium in logical block number order.

8. The method of claim 1 wherein said step of copying said groups of said blocks of data from said source storage medium to said formatted storage medium comprises the steps of:

allocating said formatted storage medium; and mounting a volume for said allocated formatted storage medium.

9. The method of claim 8 wherein said step of copying said groups of said blocks of data from said source storage medium to said formatted storage medium further comprises the steps of:

writing labels and volume headers to said formatted storage medium; and writing source file information to said formatted storage medium representative of said identified files.

10. The method of claim 8 further comprising the step of:

establishing a connection in said computer system between said source and formatted storage media.

11. The method of claim 1 further comprising the steps of:

creating a tape copy data command if said backing up of said group of said blocks of data is to be assisted by said storage controller; and instructing said storage controller to copy said group of blocks to said formatted storage medium.

12. The method of claim 11 wherein said step of instructing said storage controller to copy said group of blocks of data to said formatted storage medium is carried out iteratively for each of said group of said blocks of data for which said tape copy data command as been created.

13. The method of claim 1 wherein said groups of blocks of data representative of said previously locked files on said exception list are copied to said formatted storage medium by said host computer.

14. A computer program product comprising:
a computer usable medium having computer readable code embodied therein for backing up data on a source storage medium to a formatted storage medium in a computer system having at least one host computer and an associated storage controller, said computer program product comprising:
computer readable program code devices configured to cause said computer system to effect identifying files on said source storage medium specified for backup, said identified files comprising blocks of data;
computer readable program code devices configured to cause said computer system to effect establishing which of said identified files are currently in use, said computer readable program code device comprising computer readable program code devices configured to cause said computer system to effect determining if each of said identified files is previously locked; and computer readable program code devices configured to cause said computer system to effect constructing an exception list of each of said previously locked files;
computer readable program code devices configured to cause said computer system to effect determining groups of said blocks of data for said identified files not currently in use; and
computer readable program code devices configured to cause said computer system to effect copying said groups of said blocks of data from said source storage medium to said formatted storage medium in logical block number order.

15. The computer program product of claim 14 wherein said computer readable program code devices configured to cause said computer system to effect identifying, establishing and determining are carried out by said host computer and said computer readable program code devices configured to cause said computer system to effect copying is carried out by said storage controller.

16. The computer program product of claim 14 wherein said computer readable program code devices configured to cause said computer system to effect identifying files on said source storage medium comprises:
computer readable program code devices configured to cause said computer system to effect ascertaining if said identified files comprise an entire contents of said source storage medium; and
computer readable program code devices configured to cause said computer system to effect locking said source storage medium from subsequent accesses thereto during said backing up process.

17. The computer program product of claim 16 wherein said computer readable program code devices configured to cause said computer system to effect determining if each of said identified files is previously locked further comprises:
computer readable program code devices configured to cause said computer system to effect determining if each of said identified files is write locked.

18. The computer program product of claim 17 wherein said computer readable program code devices configured to cause said computer system to effect determining if each of said identified files is write locked further comprises:
computer readable program code devices configured to cause said computer system to effect requesting a shared read lock prior to adding said identified file to said exception list.

19. The computer program product of claim 14 wherein said computer readable program code devices configured to cause said computer system to effect determining groups of said blocks of data for said identified files not currently in use comprises:
computer readable program code devices configured to cause said computer system to effect assembling said groups of said blocks of data into contiguous blocks of data prior to said step of copying.

20. The computer program product of claim 14 wherein said computer readable program code devices configured to cause said computer system to effect assembling said groups of said blocks of data into contiguous blocks further comprises:
computer readable program code devices configured to cause said computer system to effect ignoring gaps in said contiguous blocks of data less than a predetermined gap threshold.

21. The computer program product of claim 14 wherein said computer readable program code devices configured to cause said computer system to effect copying said groups of said blocks of data from said source storage medium to said formatted storage medium comprises:
computer readable program code devices configured to cause said computer system to effect writing said files to said formatted storage medium in logical block number order.

22. The computer program product of claim 14 wherein said computer readable program code devices configured to cause said computer system to effect copying said groups of said blocks of data from said source storage medium to said formatted storage medium comprises:
computer readable program code devices configured to cause said computer system to effect allocating said formatted storage medium; and
computer readable program code devices configured to cause said computer system to effect mounting a volume for said allocated formatted storage medium.

23. The computer program product of claim 22 wherein said computer readable program code devices configured to cause said computer system to effect copying said groups of said blocks of data from said source storage medium to said formatted storage medium further comprises:
computer readable program code devices configured to cause said computer system to effect writing labels and volume headers to said formatted storage medium; and
computer readable program code devices configured to cause said computer system to effect writing source file information to said formatted storage medium representative of said identified files.

24. The computer program product of claim 22 further comprising:
computer readable program code devices configured to cause said computer system to effect establishing a connection in said computer system between said source and formatted storage media.

25. The computer program product of claim 14 further comprising:
computer readable program code devices configured to cause said computer system to effect creating a tape copy data command if said backing up of said group of said blocks of data is to be assisted by said storage controller; and computer readable program code devices configured to cause said computer system to effect instructing said storage controller to copy said group of blocks to said formatted storage medium.

26. The computer program product of claim 25 wherein said computer readable program code devices configured to cause said computer system to effect instructing said storage controller to copy said group of blocks of data to said formatted storage medium is carried out iteratively for each of said group of said blocks of data for which said tape copy data command as been created.

27. The computer program product of claim 16 wherein said groups of blocks of data representative of said previously locked files on said exception list are copied to said formatted storage medium by said host computer.

28. A method for performing a data backup in a computer system, comprising:

receiving a request signal from a host system requesting a backup transfer of data;

parsing the request signal to determine a source storage medium containing the data and to a data definition identifying files of the data in the source storage medium;

establishing a logical connection with the source storage medium;

determining whether each of the files identified in the data definition is write locked, wherein the determining includes placing each of the write locked files on an exception list;

placing a shared read lock on group of the files not on the exception list; and copying the group of the files from the source storage medium to a formatted storage medium.

29. The method of claim 28, further including repeating the determining, placing, and copying steps for the files on the exception list.

30. The method of claim 28, wherein the copying includes writing the group of files to the formatted storage medium in logical block number order without reference to an order of the files on the source storage medium.

31. The method of claim 28, wherein the copying includes transmitting read commands specifying the group of the files over the logical connection to the source storage medium.

32. The method of claim 28, further including receiving an on-media structure definition from the host system and parsing the on-media structure definition to determine a format for storing the group of the files from the source storage medium on the formatted storage medium.

33. The method of claim 32, wherein the on-media structure definition includes fields selected from the group of fields consisting of a header descriptor, a trailer descriptor, a block size, a block structure, and an error correction code algorithm specification.

34. The method of claim 32, wherein the copying comprises formatting data in the group of the files based on the format determined from the on-media structure definition.

35. A method for backing up data on a source storage medium to a formatted storage medium in a computer system having at least one host-computer and an associated storage controller, said method comprising:

identifying files on said source storage medium specified for backup, said identified files comprising blocks of data;

establishing which of said identified files are currently in use;

determining groups of said blocks of data for said identified files not currently in use, wherein said determining includes assembling said groups of said blocks of data into contiguous blocks of data by at least in part ignoring gaps in said contiguous blocks of data less than a predetermined gap threshold; and copying said groups of said contiguous blocks of data from said source storage medium to said formatted storage medium.

36. A method for backing up data on a source storage medium to a formatted storage medium in a computer system having at least one host-computer and an associated storage controller, said method comprising:

identifying files on said source storage medium specified for backup, said identified files comprising blocks of data;

establishing which of said identified files are currently in use;

determining groups of said blocks of data for said identified files not currently in use, wherein said determining includes assembling said groups of said blocks of data into contiguous blocks of data;

copying said groups of said contiguous blocks of data from said source storage medium to said formatted storage medium in logical block number order; and determining if said backing up of said group of said blocks of data is to be a hardware assisted backup, wherein if said backing up is a hardware assisted backup, creating a tape copy data command and instructing said storage controller to copy said group of blocks to said formatted storage medium and further wherein said instructing is performed iteratively for each of said group of said blocks of data for which said tape copy data command has been created.

* * * * *